United States Patent [19]
Rivera

[11] Patent Number: 6,097,127
[45] Date of Patent: Aug. 1, 2000

[54] PERMANENT MAGNET DIRECT CURRENT (PMDC) MACHINE WITH INTEGRAL RECONFIGURABLE WINDING CONTROL

[76] Inventor: Nicholas N. Rivera, 203 Mashie Dr., Vienna, Va. 22180-4921

[21] Appl. No.: 09/320,588

[22] Filed: May 27, 1999

Related U.S. Application Data

[63] Continuation-in-part of application No. 08/909,086, Aug. 14, 1997, Pat. No. 5,912,522
[60] Provisional application No. 60/024,645, Aug. 22, 1996.

[51] Int. Cl.[7] .............................. H02K 3/00; H02K 23/02
[52] U.S. Cl. ........................... 310/184; 310/156; 310/180; 310/179
[58] Field of Search .................................. 310/156, 179, 310/180, 195, 186, 203, 206, 207, 177, 184; 318/173, 174

[56] References Cited

U.S. PATENT DOCUMENTS

| | | | |
|---|---|---|---|
| 2,193,675 | 3/1940 | Merrill | 310/156 |
| 2,611,799 | 9/1952 | Ackerman | 310/195 |
| 3,230,434 | 1/1966 | Bauerlein | 310/156 |
| 3,914,629 | 10/1975 | Gardiner | 310/46 |
| 4,217,529 | 8/1980 | Bourke et al. | 318/351 |
| 4,227,107 | 10/1980 | Ban et al. | 310/198 |
| 4,424,463 | 1/1984 | Musil | 310/49 R |
| 4,692,645 | 9/1987 | Gotou | 310/184 |
| 4,733,118 | 3/1988 | Mihalko | 310/177 |
| 4,874,975 | 10/1989 | Hertrich | 310/186 |
| 4,890,049 | 12/1989 | Auinger | 318/771 |
| 5,202,599 | 4/1993 | Kao | 310/234 |
| 5,412,268 | 5/1995 | Arnaud et al. | 310/67 R |
| 5,418,436 | 5/1995 | Apuzzo | 318/497 |
| 5,442,250 | 8/1995 | Stridsberg | 310/186 |
| 5,614,775 | 3/1997 | Horski et al. | 310/68 R |
| 5,614,799 | 3/1997 | Anderson et al. | 318/439 |
| 5,808,392 | 9/1998 | Sakai et al. | 310/214 |

FOREIGN PATENT DOCUMENTS

| | | | |
|---|---|---|---|
| 0 300 126 | 6/1994 | European Pat. Off. | H02K 29/06 |
| 0 678 968 A2 | 10/1995 | European Pat. Off. | H02K 29/06 |

OTHER PUBLICATIONS

Excerpts from a book entitled: "Brushless Permanent–Magnet Motor Design" by Duane C. Hanselman, published in 1994 by McGraw Hill, Inc., New York; pp. 61–123 and 155–180.

Jan. 1996—Article entitled "Brushless DC Motor Provides High Power Density and High Efficiency at Low Cost for Electric Transportation" by Neil Garcia–Sinclair, Jan. 1996 issue of PCIM magazine at pp. 9, 10, 12, 14, 16, 19 and 20.

*Primary Examiner*—Nestor Ramirez
*Assistant Examiner*—B Mullins
*Attorney, Agent, or Firm*—William D. Hall

[57] ABSTRACT

A permanent magnet direct current machine is provided. The rotor has permanent magnets acting as poles for feeding magnetic flux to the stator. The stator has a multiplicity of "slot paths". Each slot path has as many slots as there are poles on the rotor and also has as many coils as there are poles on the rotor. The coils of a slot path are equally spaced around the axis of the machine and each coil of the slot path is wound through two slots. The coils of a slot path may be switched from series to parallel to hybrid relationships to vary the operating characteristics of the machine.

26 Claims, 12 Drawing Sheets

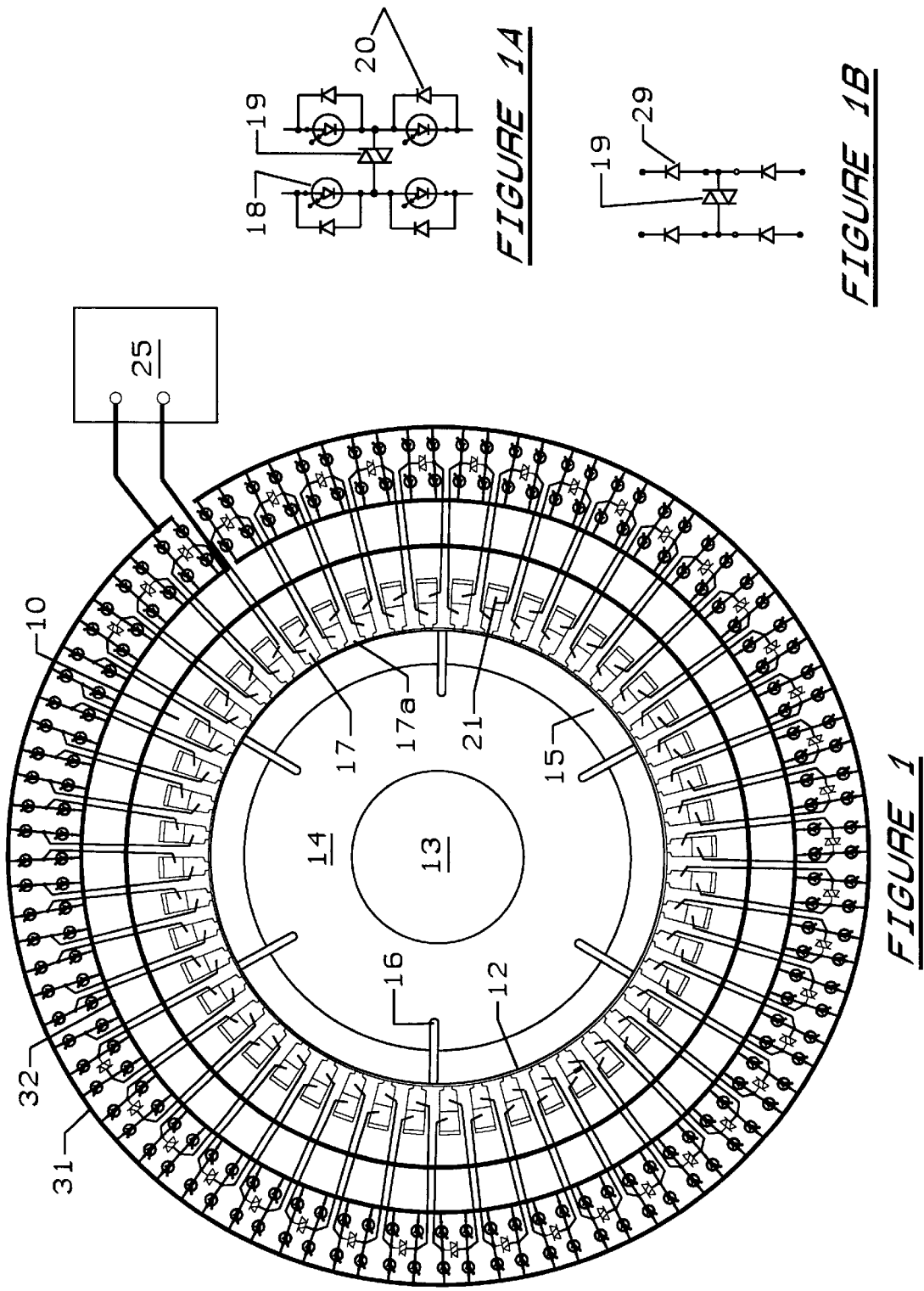

PERMANENT MAGNET DIRECT CURRENT (PMDC) MACHINE WITH INTEGRAL RECONFIGURABLE WINDING CONTROL

RELATED APPLICATIONS

This application is a continuation-in-part of my prior copending application, Ser. No. 08/909,086 filed Aug. 14, 1997 now U.S. Pat. No. 5,912,522 which claims the benefit of my Provisional application Ser. No. 60/024,645, filed Aug. 22, 1996 and entitled Permanent Magnet Direct Current (PMDC) Motor With Integral Reconfigurable Winding Control.

BACKGROUND OF THE INVENTION

Prior permanent magnet direct current motors are explained in detail in a book entitled: "Brushless Permanent Magnet Motor Design" by Duane C. Hanselman, published in 1994 by McGraw Hill, Inc., New York. All commercial brushless, permanent magnet direct current motors known to date operate from external variable voltage, variable frequency sources. The air gap fields produced by permanent magnets cannot be externally controlled such that the electromotive forces (emf) or back-electromotive forces (back-emf) of stator windings are strictly functions of speed. The term emf is customarily used for a generator while back-emf is used for a motor. Both terms refer to the same effect caused by the rate of change of flux linkage with a winding which is proportional to rotational speed.

The amplitude of the air gap field in a PM motor is practically constant under normal operating conditions. As the rotor speed increases, so does the back-emf of the motor windings. In the following relationships $E_{emf}$ or $E_{bemf}$=Blv where B is air gap field density, l is the length of winding wire coupling the field B and v is the tangential speed of the rotor pole face at the air gap.

$$E_{dc} - iR_w - L_w di/dt - E_{bemf} = 0$$

or $$E_{dc} - iR_w - L_w di/dt - Blv = 0$$

where $E_{dc}$ is supply voltage, $E_{bemf}$ and Blv are back-emf voltage, i is winding current and $R_w$ and $L_w$ are winding resistance and inductance. Disregarding the inductance term for steady state conditions and solving for winding current:

$i=(E_{dc}-Blv)/R_w$, and considering that motor torque T=Blir where B is air gap field density, l is the length of winding wire coupling the field B, i is winding current and r is the air gap radius. As the rotor speed increases, so does the back-emf voltage resulting in reduction of winding current if the supply voltage is constant. Thus, with constant supply voltage, the torque is reduced as the winding current is reduced with increasing rotor speed. To overcome this limitation in torque, power converters driving prior art PMDC motors must boost the output voltage to the winding. This increases the complexity and robustness of the motor controller and the degree of voltage stress and heat generation concentrated in the controller power semiconductors. The switching components must then have high voltage ratings as well as high current ratings.

In a PM generator the amplitude of the air gap field is also practically constant. For a direct current generator driving a resistive load RL the mathematical relatioship is:

$$E_{emf} - iR_w - L_w di/dt - iR_L = 0$$

or $$Blv - iR_w - L_w di/dt - iR_L = 0$$

where its air gap voltage $E_{emf}$=Blv, i is winding current and $R_w$ and $L_w$ are winding resistance and inductance. Disregarding the inductance term for steady state conditions, Blv–i $R_w$=i $R_w$=i$R_L$ and the expression on the left side of the equal sign is the generator output voltage to the load. Therefore, at constant rotational speed the output voltage of a PM generator is constant, its emf being a function of speed.

It is practically impossible to have perfectly uniform and balanced air gap field intensities and distributions produced by permanent magnets. In prior art PMDC machines this condition, combined with the high rates of change of magnetic coupling caused by switching distributed phase windings cause several undesirable parasitic effects. The most objectionable of these effects is torque pulsations or torque ripple. With trapezoidal or asymmetrical air gap field distributions and phase current waves distributed over the pole width, prior art PMDC machines have large components of space harmonics. Those harmonics induce circulating currents in the rotor and high core losses in the stator. Therefore, undesirable losses composed of hysterisis and eddy currents take place in the rotor and the stator core. To overcome those parasitic effects, technologies involving pulse width modulation, multi-level power converters or power conditioners are used to make the controller outputs closer to sine waves. This limits the utilization of magnetic core circuits in those motors to approximately 60 percent. The following references address the problems cited above for prior art motors driven by external variable voltage, variable frequency power converters:

IEEE Conference Paper, Titled: Performance Analysis of Permanent Magnet Brushless DC Motor, Authors: Miraoui, A.; Lin DeFang; Kauffman, J. M.

IEEE Transactions on Industrial Electronics, VOL 43, No. 2, April 1996, Titled: Identification and Compensation of Torque Ripple in High-Precision Magnet Motor Drives, Authors: Holtz, Joachim and Springob, Lothar.

1994 Institution of Electrical Engineers, Title: Adverse Electrical Phenomena in Rail Traction Using Alternating Current Motors, Authors: Minalescu, D. and Pantelimon, M.

SUMMARY OF THE INVENTION

A direct current machine has poles on its rotor and a stator of magnetic material has slots that are adjacent the air gap. A multiplicity of coils are wound in said slots and are angularly spaced around the surface of the stator. The aforesaid coils are connected to form a number of separate circuits. Each circuit is defined as a "slot path" and includes as many of said coils as there are poles on said rotor. Control devices energize the slot paths to provide rotating current sheets that react with the fields of the permanent magnets to apply a torque to the rotor. Each pole, at any instant in time, faces a group of said coils. Such group, at said instant, produces a field which surrounds said group and passes between said group and the pole that faces the group.

A strip of magnetic material is contiguous with the air gap. The strip may be on the rotor in which case it extends across the outer face of each pole, or it may be made part of the surface of the stator. This strip of magnetic material provides a low reluctance path for the flux produced by the coils on the stator.

When the machine is to be used only as a generator, a simplified H-bridge (see FIG. 1B) is connected across the output of each slot path. When the flux through a slot path reverses, the H-bridge for that slot path reverses the direction of the current flowing from the slot path to the output of the generator.

Prior art generators that have rotors whose field is produced by permanent magnets, must have their speed changed in order to change the output voltage. I can change the voltage of my generator by reconfiguring the coils of all slot paths. This arrangement is especially useful when the generator is feeding its output voltage to a motor.

BRIEF DESCRIPTION OF THE DRAWINGS

FIG. 1 is a schematic cross-section of my new machine and controller.

FIG. 1A is a schematic of a power control module of the machine of FIG. 1 configured as a motor or generator.

FIG. 1B is a schematic of a power control module of the machine of FIG. 1 configured as a generator only.

DETAILED DESCRIPTION

Figure 3A:
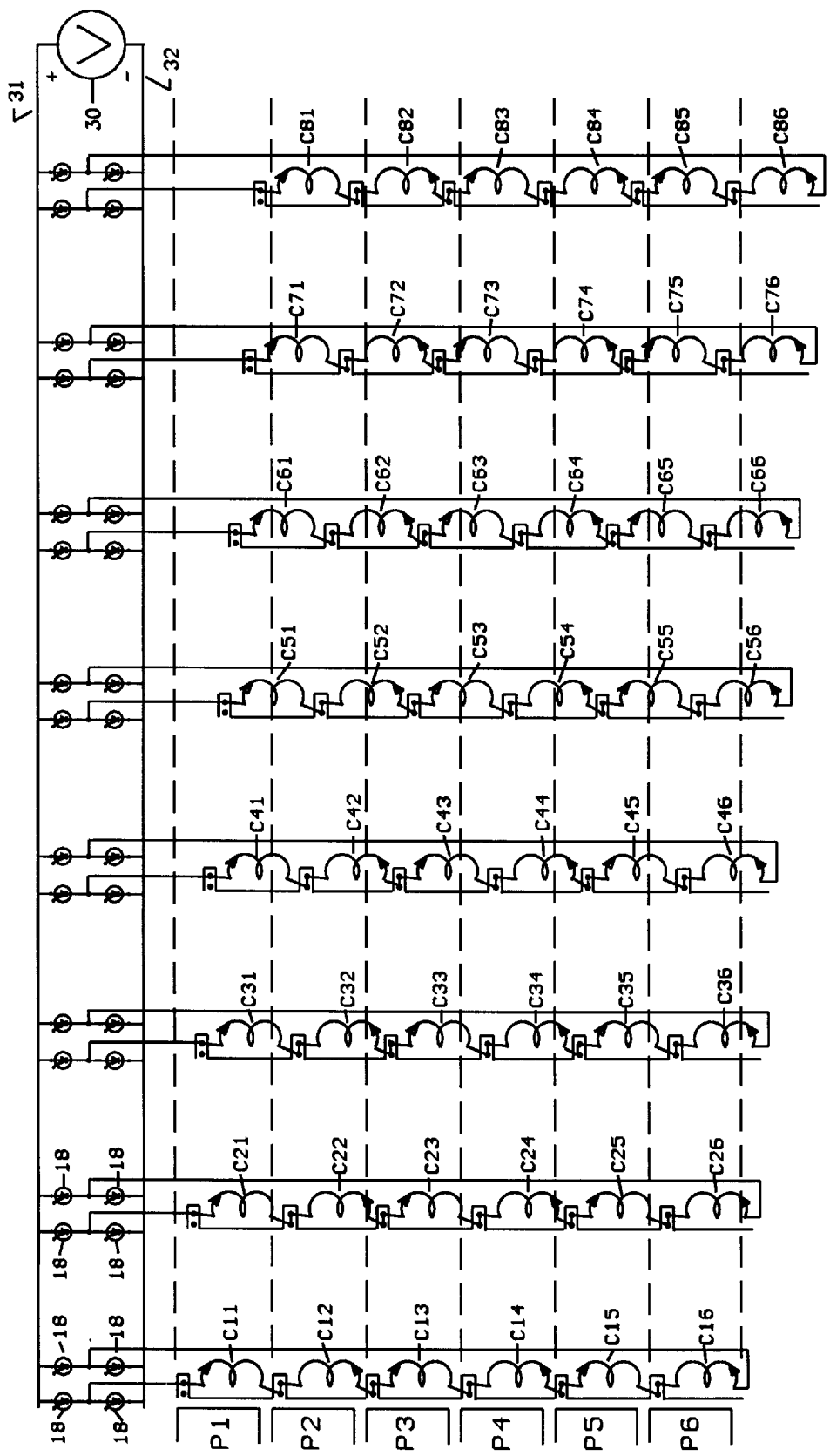
FIG. 3A is a schematic of the power controller with some components not shown and winding configurations during startup and low speed operation.
Figure 6:
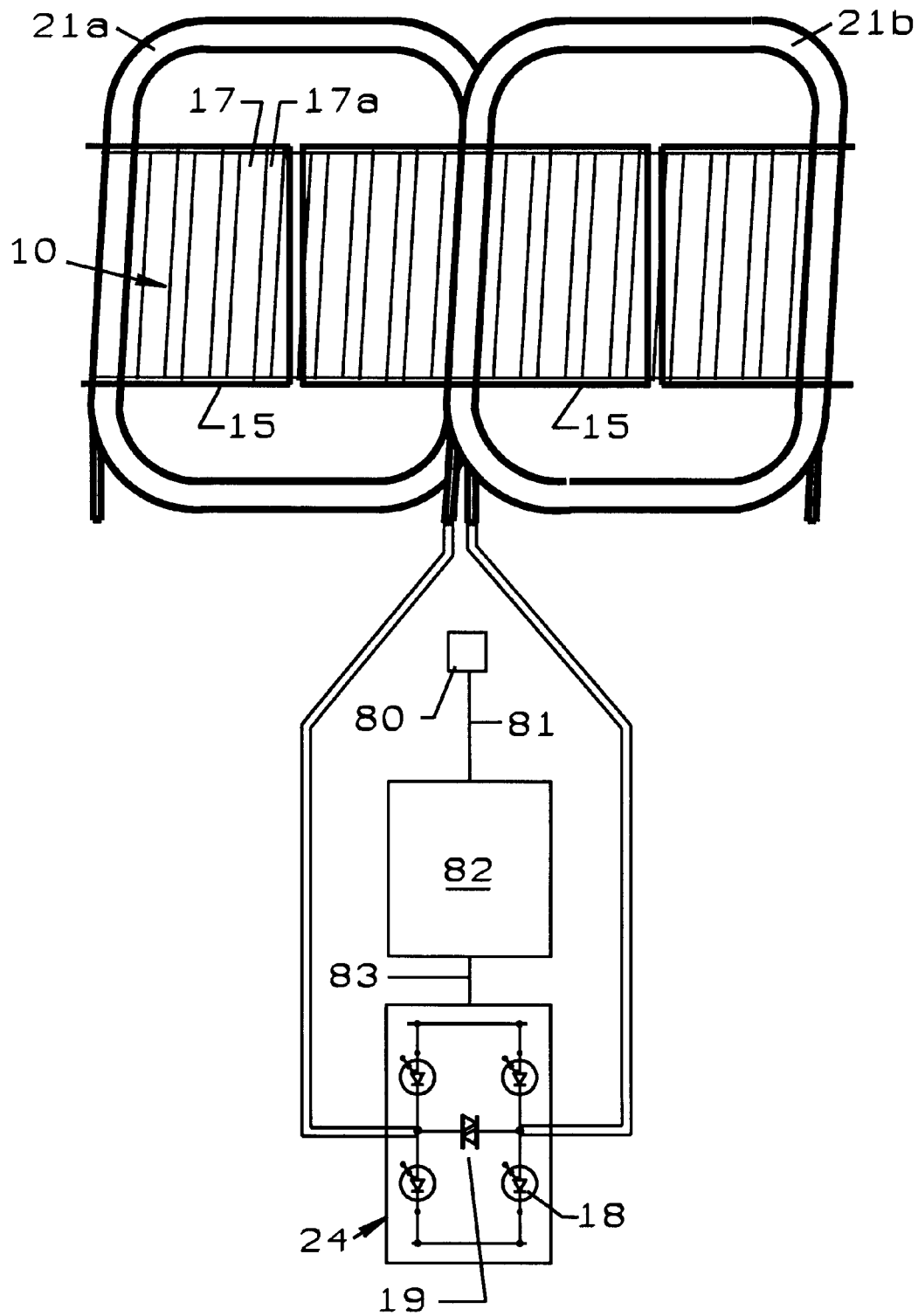
FIG. 6 shows an elementary winding control diagram.

I will first describe the various parts, per se, and later describe the system in more detail. A "slot path" as used in this specification, and in the claims, is hereby defined as a circuit including a group of stator coils in slots, which slots are angularly displaced from each other by the angular width equal to 360 degrees divided by the number of poles; there being as many such slots in a slot path as there are poles on the rotor. Each coil of any given slot path extends through first and second slots that are angularly spaced apart by the angular distance equal to 360 degrees divided by the number of poles as shown in FIG. 6. Hence, each slot has two coils of a given slot path passing through it. There are slots between said first and second slots that are parts of other slot paths. The new machine has a stator core 10, supported on a frame or casing 11 and contiguous with air gap 12. There are stator slots 17 separated by stator teeth 17a. The rotor may include a shaft 13, a rotor core 14 and a series of magnets 15. As is well known, there may be a sleeve (not shown) around the outside surfaces of the magnets 15 to hold the magnets in place notwithstanding centrifugal forces. The positive pole of each magnet 15 is adjacent to the negative pole of each adjacent magnet 15. Separating each magnet 15 from its adjacent magnet 15 is a rotor slot 16. The rotor slots 16 may be filled with any nonmagnetic material (including air). There are 48 winding coils 21 (FIG. 1) identified by reference numbers such as C11 (FIG. 3A). There are, for example, eight winding coils per pole and the illustrations assume that there are six poles although any suitable number of winding coils and/or poles may be used. There are in this example 48 stator slots 17. Thus, in this example there are eight slots per pole. The numbers of stator slots 17 will vary for different machine designs. The windings are energized by solid-state control modules (24) depicted in FIG. 1A, which are supplied from positive 22 and negative 23 ring buses and a terminal block 25. The terminal block 25 provides a suitable place to connect the electric machine to an external circuit for input (motoring) or output (generation).

Figure 5:
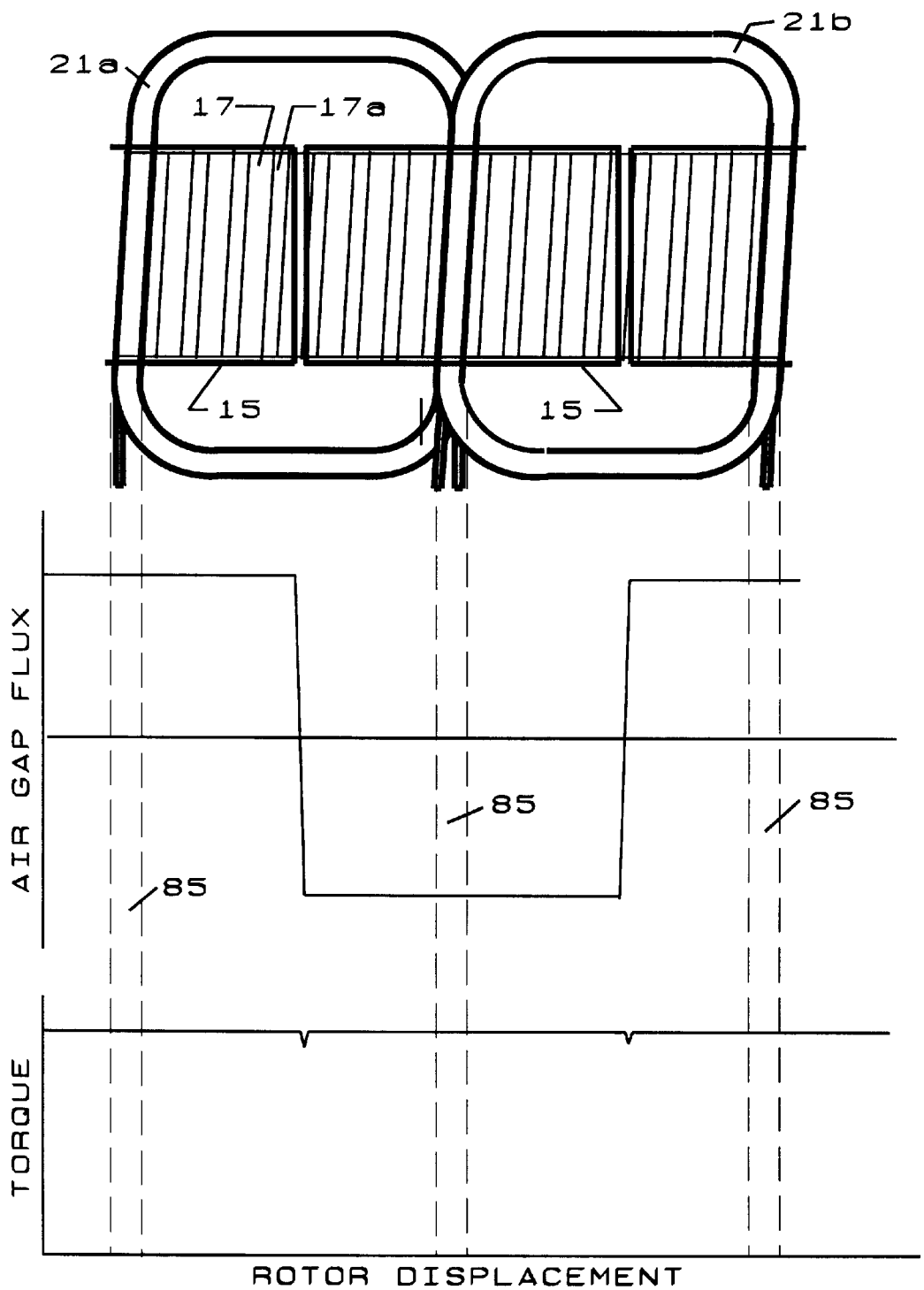
FIG. 5 illustrates the air gap field coupling concentrated slot coils in my new concept.

The PM rotor, 14, 15, 16, has a substantially uniform magnetic flux distribution of a magnitude near the saturation induction limit of the stator core material 10 to achieve maximum torque at any speed. That is, T=Blir relies on a substantially uniform air gap flux density B for the entire effective air gap area to achieve maximum torque T for any value of current i. To produce a substantially uniform air gap field I prefer to use arcuate magnets 15, surface mounted on a cylindrical rotor core 14 to produce the highest achievable air gap flux density. The flux density in the stator core, measured in the teeth 17a contiguous to the air gap, should be near to (at least 80 percent of) the saturation induction limit of the core material used. To produce an even distribution of flux lines across the face of each magnet pole 15, I take three measures: cut deep radial slots 16 in the rotor core between positive and negative magnets 15, select a ferromagnetic material of low relative permeability, such as silicon steel for the rotor core 14 and select a ferromagnetic material of high relative permeability, such as grain oriented silicon steel or HiperCo for the stator core 10. This is done to minimize the differences in reluctances between the longer magnetic flux paths through the centers of the magnets 15 and the shorter flux paths at the edges between magnets 15 to result in even flux distributions across the faces of the magnets 15 in the air gap 12 and stator core teeth 17a. As an example, the machine stator and rotor cores 10, 14, shown in FIG. 1 have the above geometry and other typical features that work well with my machine concept. Those are 6 rotor magnet poles 15 and 48 stator slots 17, each slot containing a concentrated double winding 21 as shown in FIG. 6 that results in 8 windings per pole. FIG. 5 shows the outline of a concentrated slot winding coil, also known in the art as a double layer lap winding. The number of windings and slots could be increased or decreased depending on the required torque capacity and space constraint.

The resultant air gap flux produced by a permanent magnet used in the magnetic structure of this invention is inherently highly resistant to demagnetization. The useful flux output of a permanent magnet is inversely proportional to the permeance of the magnetic circuit, part of which depends on the operating points in the magnetization curves of the stator and rotor cores. This is caused by the ratio of external permeance of the magnetic circuit to the internal permeance of the magnet. Because of this, the permanent magnet is unable to operate at the saturation point of the core where the external permeance is less than the internal permeance of the magnet. The magnet then assumes an operating point that lies below saturation, in the knee of the magnetization curve where the core permeance is high, though not maximum. When a load current induces a demagnetizing flux, the operating point in the magnetization curve of the core is lowered such that its permeance is increased closer to maximum. Then, the higher external permeance enables the permanent magnet to increase its flux output closely back to where it was. Therefore, as stated in the Summary of the Invention each winding spends most of the time under an air gap field of practically nonchanging magnitude, excepting the short periods of transitions between poles.

In a PM machine it is practically impossible to have perfectly uniform and balanced air gap field intensities and distributions. In a motor with multiple concentrated slot windings, if the air gap fields passing through individual windings are different, the corresponding back-emfs change proportionally causing winding currents to change inversely. Then the products of field fluxes B and currents i in Torque=Blir remain constant resulting in constant torque. See FIG. 5, which illustrates the narrow band of field coupling 85 produced by the coils concentrated in slots. This does not happen with windings distributed over the entire pole width and is the reason for inherent freedom from pulsating torques in multiple concentrated slot windings. Cogging torques that could be caused by the reluctance of stator core slots are eliminated by putting a skew in the stator core. Winding and switching device interconnections are configured to block flow of any possible circulating currents that could also result in torque pulsations and core losses.

Figure 7:
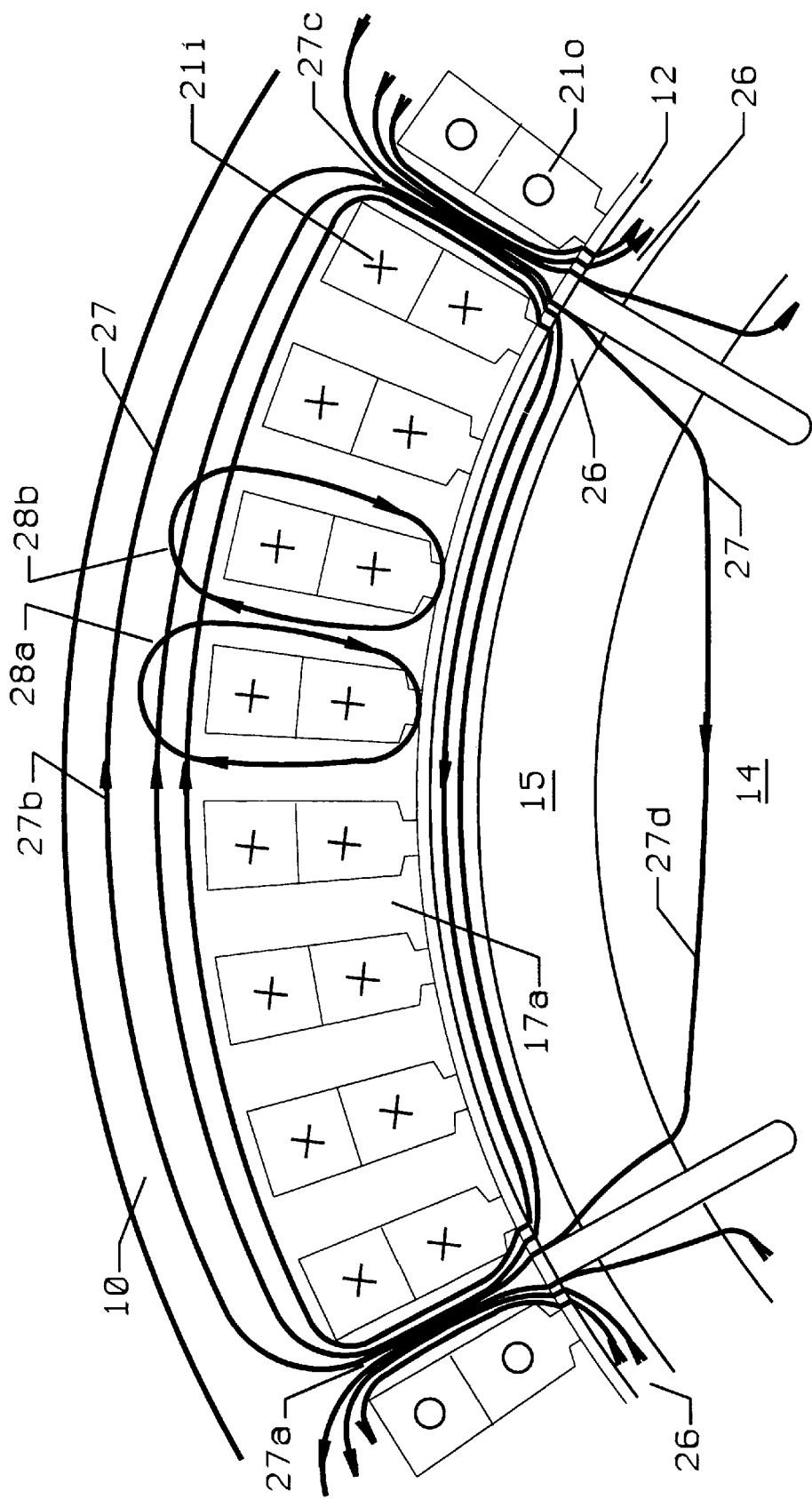
FIG. 7 is a cross-section of a portion of the machine illustrating the demagnetizing flux distribution and an alternative flux bypass means to reduce linkage with the rotor core.
Figure 8:
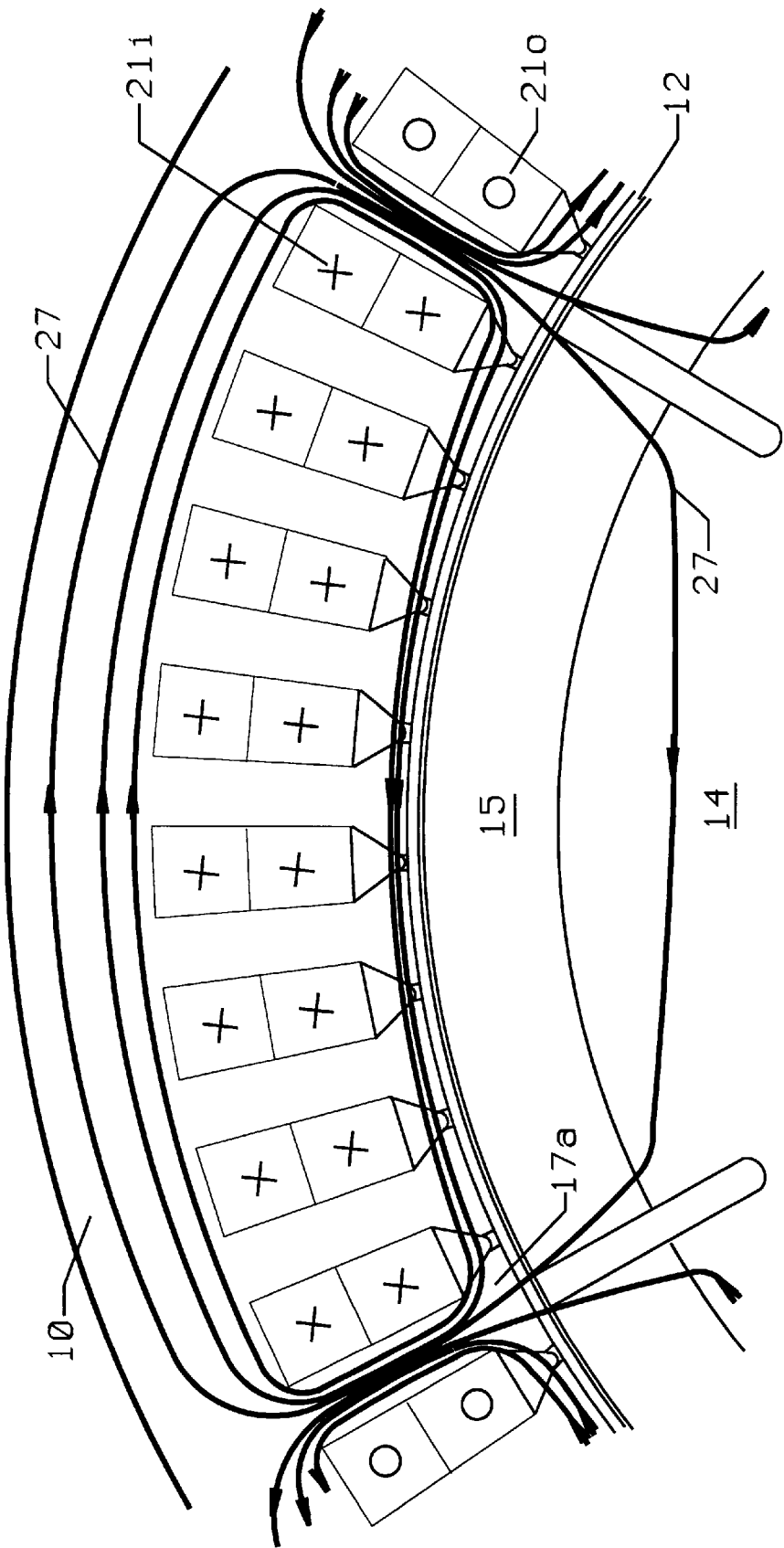
FIG. 8 is a cross-section of a portion of the machine illustrating a second alternative flux bypass means to reduce linkage with the rotor core.

Alternative constructions of the rotor and stator magnetic structures are depicted in FIGS. 7 and 8. The option in FIG. 7 adds an extension piece 26 to each pole, made of laminate core material with an arcuate shape concentric with the axis of the rotor and discontinued at the spaces between poles. The option shown in FIG. 8 consists of increasing the cross-sectional area of the shoes of the stator slot teeth 17a as a means of increasing the amount of magnetic core material contiguous to the air gap at the inner surface of the stator. Both options reduce the number of demagnetizing flux lines 27 that pass directly through the permanent magnet and the rotor core. The flux lines 27 are induced by load currents 21i and 21o.

All the slots in front of each magnet pole have current components that flow in the same direction. This is shown in FIGS. 7 and 8. The currents 21i, 21o induce fluxes according to the right hand rule. Therefore, the magnetic flux lines 28a, 28b induced in each slot tooth (between adjacent slots) located in front of a magnet pole cancel each other. The resultant fluxes are additive only at slot teeth located between poles because the currents in the adjacent slots flow in opposite directions. Each effective load induced flux line 27 then follows a circuit 27a, 27b, 27c, 27d and 27a as shown in FIG. 7. The air gap fluxes produced by the magnets (FIG. 5) are passing through zero nulls at the points where the fluxes induced by load currents are maximum, thus avoiding interference with the maximum demagnetizing fluxes. The component of demagnetizing flux 27 that directly passes through each permanent magnet 15 and the rotor core 14 can be further reduced if core material 26 is provided at the outer radius of the rotor as shown in FIG. 7 or in the slot teeth 17a of the stator core as shown in FIG. 8.

Figure 1C:
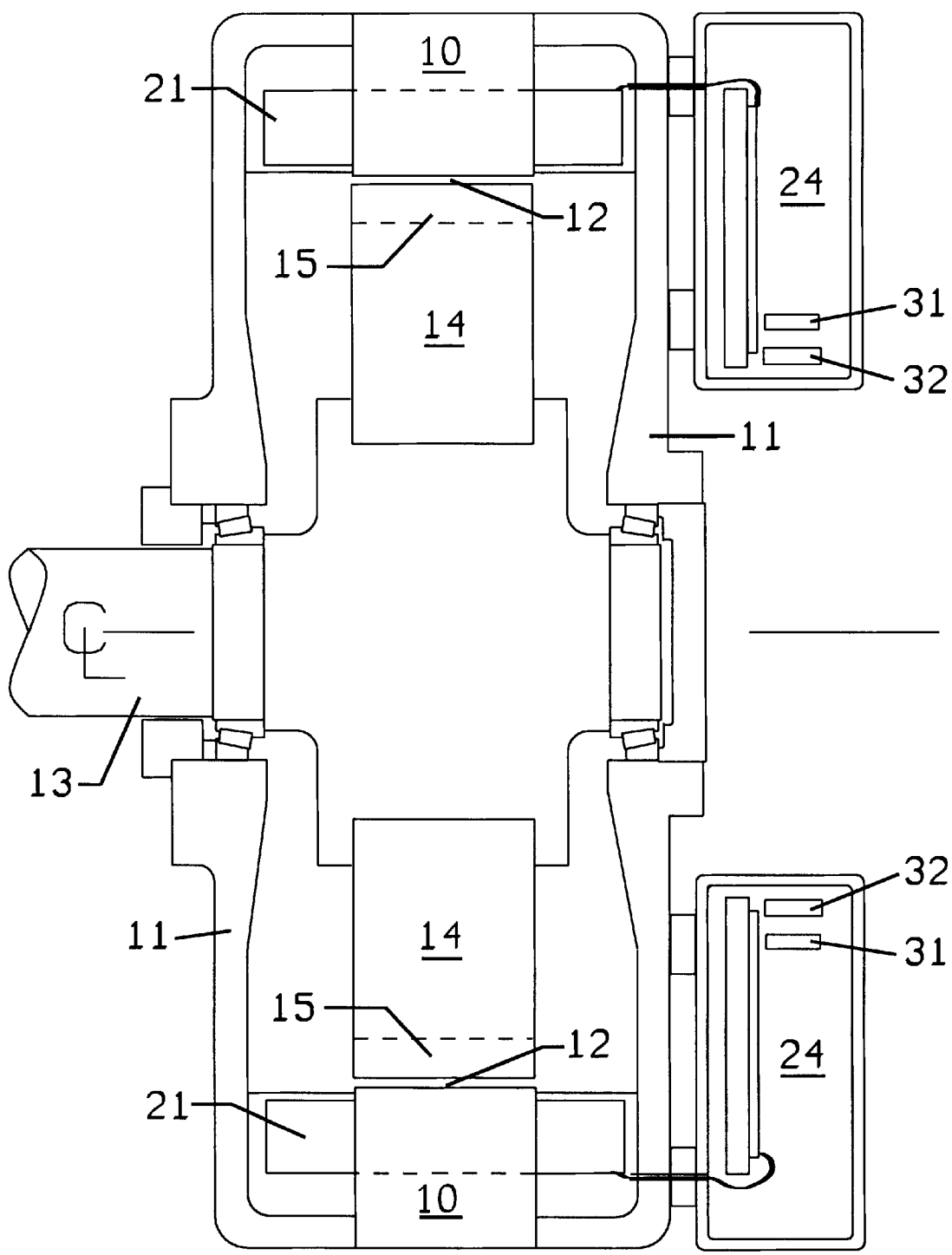
FIG. 1C is a vertical cross-section of my new machine.

When the machine is a generator its control system is simpler than when it is a motor. The control module for a machine designed to work as a generator is shown in FIG. 1B. This control module is made up of rectifier diodes 29 forming an "H" bridge and an isolation triac (IT) 19. The rectifier diodes 29 are functionally the same as the free-wheeling or regenerative rectifier diodes 20 of the motor control module of FIG. 1A, however, they should be rated for continuous duty. The isolation triac (IT) 19 also functions as in the motor control module of FIG. 1A. The generator control module is simpler because it does not require switches 18 (FIG. 1A) for the reasons given below.

A generator driven by a prime mover does not require the control and protective features of a motor, such as magnet polarity sensing for startup or winding current limiting control. In this invention the voltage and current wave shapes generated by slot path coils concentrated in narrow radial slots are naturally commutated under soft switching conditions. The "H" bridge made up of diodes 29 commutates naturally as the generated voltages and currents reverse direction. The isolation triacs (IT) 19 are used to reconfigure the generator's windings in the same way as when the machine is a motor. Reconfiguration of the windings by different control modes as shown in FIGS. 3A (Control Mode 1) and 3B (Control Mode 2) enables a PM machine to generate different output voltages when driven at constant rotational speed by its prime mover. In a motor, different slot paths may operate in different modes to control torque and speed. A generator is different from a motor in that all slot paths must be in the same control mode to generate different voltages. Each generated voltage is essentially constant at a discrete value maintained by the regulated constant rotational speed of the prime mover.

Figure 2:
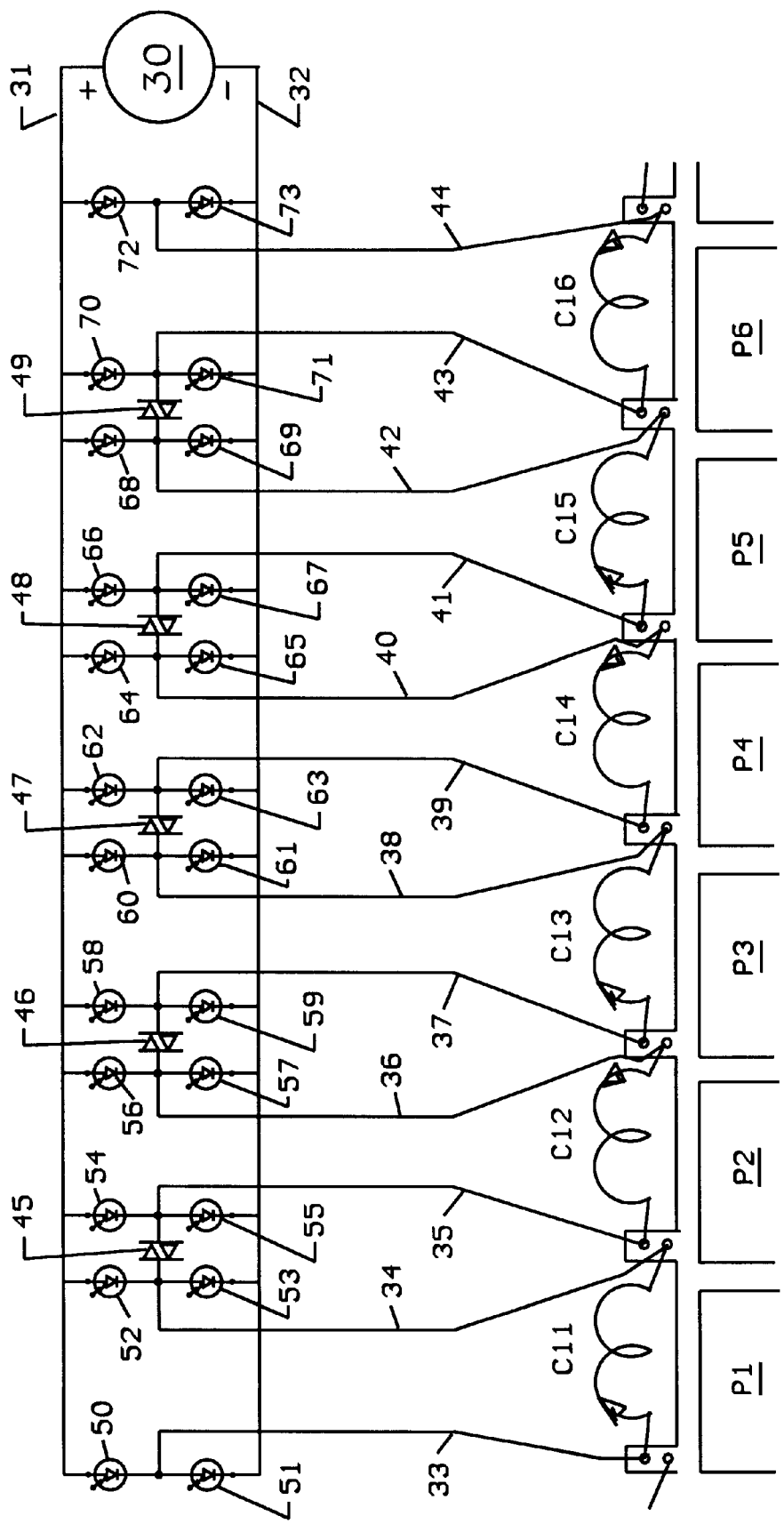
FIG. 2 is a simplified schematic of the power controller that shows a typical slot path circuit.

The following description uses FIG. 2 and assumes that the slot path circuit shown is that of a generator. By this assumption the switches 50, 51, 52, 53, etc. are the same as the rectifier diodes 29 of FIG. 1B and component 30 is a load instead of a source. When the isolation triacs 45, 46, 47, 48 and 49 used to reconfigure the generator's windings connect several or all of the coils in series, the voltage of terminal wires 31 and 32 is higher than that of the individual coils in the circuit. That is, the voltage across wires 31 and 32 is higher than that across wires 35 and 36 or 37 and 38 connecting coils to the intermediate control modules. Then the rectifier diodes 52, 53, 54, 55 etc. in the intermediate control modules are reverse biased by the higher terminal voltage. This puts the intermediate diodes in cut-off without need for the sensing and control devices in controller 82 of FIG. 6. Only the isolation triacs 45, 46, 47, 48 and 49 are controlled to select the generator output voltage. Output voltage selection may be arbitrary and done by manual control of a selector switch or by an external automatic control means such as a process controller.

The output voltage of a generator is proportional to the tangential speed of the rotor at the air gap (rotational speed) and the magnitude of the air gap magnetic field. As is well known for a prior art generator with a wound rotor, the field current that produces the air gap flux is provided by either a static or a rotating exciter. The exciter is in turn controlled by a voltage regulator to maintain a constant air gap flux while under the demagnetizing influence of the load currents in the stator of the generator. If a demagnetizing load current causes a reduction in the terminal voltage, the field excitation current increases by command of the voltage regulator. In prior art generators as well as in this invention the air gap field provided by permanent magnets behaves similarly. Therefore, any permanent magnet generator should be capable of maintaining a constant air gap flux under load, analogous to a wound rotor machine with regulated field excitation. This, combined with constant rotational speed results in a terminal voltage that is essentially constant.

The following functional descriptions pertain to a machine working as a motor, but they are applicable to a generator with the exceptions given above. At any given point in time, the flux of each magnet pole 15 passes through all of the many windings covered by the pole, except for the short period required to switch the polarity of each winding or winding set as will be explained below. This results in steady or continuous potentials and current flows through most of the windings. There are eight slot paths in the embodiment shown. Each slot path is continuously energized, however, at the point of transition between two adjacent magnet poles during field reversal coincident with the angular position of the slot path, the module 24 (FIGS. 1A and 6) acts temporarily to reverse the direction of the current in the slot path. For example, in FIG. 6 a magnetic sensor 80 detects the passage of the magnet pole and produces a signal that the controller 82 uses to control commutation. Thus, the controller triggers the switches 18 in the module 24 to act as a double-pole-double-throw switch to reverse the direction of the current through the slot path. This reversal occurs when the space between adjacent magnets 15 passes the sensor 80. Only one winding per pole is switched to commutate polarities. In a machine with eight windings per pole, this results in 12.5 percent of the switching energy that would exist if the entire pole were commutated. Note that the winding is switched in a very short time with near zero net energy change per pole. The collapsing flux linkage with the winding at the time (or position) of transition between magnet poles induces an opposing or canceling current, thus resulting in conditions for soft switching with minimum voltage overshoot and minimum switching energy loss. Therefore, the machine effectively operates in a steady state condition. The dc ripple for such a machine is practically zero, with low electromagnetic noise and practically zero torque pulsations. This minimizes parasitic effects.

Figure 3B:
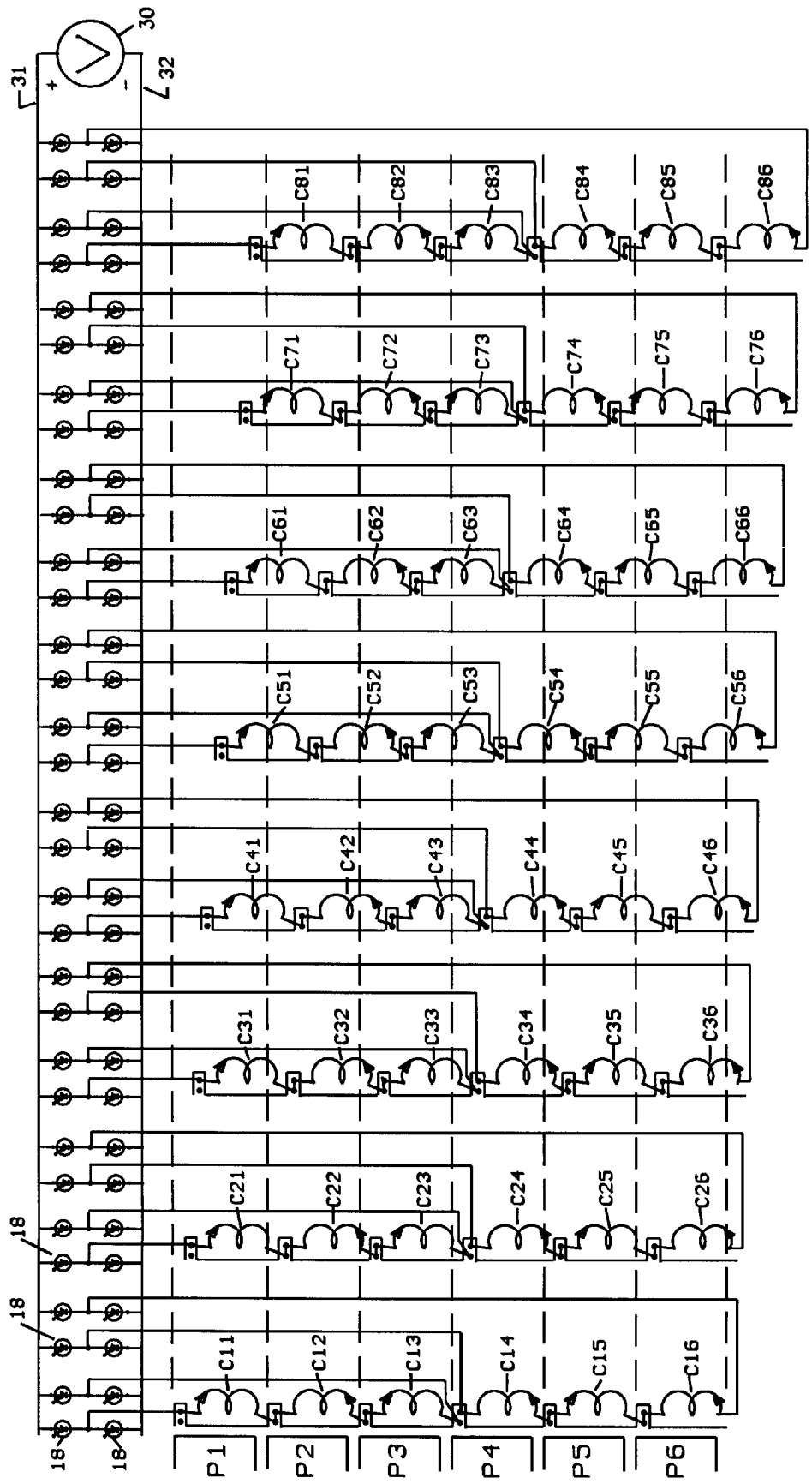
FIG. 3B is a schematic of the power controller with some components not shown and winding configurations during high speed operation.

FIGS. 1, 2, 3A and 3B show an example of the machine winding control system. FIG. 2 shows the windings in a single stator slot path traversing all six poles of the machine. The switches 18 in FIGS. 2, 3A and 3B and the isolation triacs 19 of FIG. 2 perform the function of reconfiguring the winding control circuit of FIG. 3A to that of FIG. 3B as the motor speed increases. In FIGS. 3A and 3B winding coil designations are preceded by the letter C, followed by the slot path number and the pole number assuming a position of the rotor such as shown in FIG. 1. So, C11 is the coil in slot path 1, across pole 1. Each winding coil is concentrated in two slots as shown in FIG. 5, one in front of a positive pole and one in front of a negative pole, both in the same relative position to each pole. Alternate windings in any given slot path are reverse connected to result in tangential forces in the same direction under the influence of opposite poles. The switching configuration is a special "H" bridge 24 (FIG. 1A) made up of a power semiconductor module fitted with MCT or IGBT switches 18, free-wheeling or regenerative rectifier diodes 20 and an isolation triac 19. Each winding coil or coil set is commutated in the appropriate direction by integral, pole position sensing and control circuits as explained above. For a machine designed as a generator the "H" bridge 24 has rectifier diodes 29 and an isolation triac 19 as shown in FIG. 1B. When the windings are connected as shown in FIG. 3A, the machine is in Control Mode 1 and when connected as in FIG. 3B, the machine is in Control Mode 2 as will be described in detail below. These switches 18 and isolation triacs 19 also change from FIG. 3B (Control Mode 2) to FIG. 3A (Control Mode 1) as the motor speed decreases. The control wire 81 of FIG. 6 has a pulse rate produced by sensor 80, proportional to the speed of the rotor 13, 14, 15. Using that information as an input, the control 82 may switch modes based on speed and/or on rotor position, if and when the sensor 80 is installed in the same angular position as a stator slot 17. Other sensors or transducers can also be added, along with the attendant control logic to enable the control 82 to reconfigure the motor in response to other parameters, such as torque and winding current or to provide redundant sensing. The control logic can be made to control many optional operating modes such as dynamic braking or manual override and to provide automatic, supervisory protective features such as prevention of overspeed.

A hybrid series/parallel coil arrangement is defined as a system in which there are groups of coils in series with others, with the groups in parallel. For example, the coil arrangement of FIG. 3B is a hybrid series/parallel coil arrangement. To explain further, assume that there are six coils per slot path. These six coils could be configured in either of two hybrid series/parallel coil arrangements, thus: There could be two groups of coils with three coils in series per group, the two groups in parallel. Secondly, there could be three groups of coils with two coils in series per group, the three groups in parallel.

For simplicity, the term "switch" refers to IGBTs, MCTs and rectifier diodes used in the "H" bridge modules 24 shown in FIGS. 1A and 1B. Free-wheeling or regenerative rectifier diodes 20 in FIG. 1A are standard components used in the control of inductive circuits to provide a coil discharge bypass and prevent damage that may be caused by reverse overvoltages under switching conditions. Isolation triacs (IT) 19 are used to either interconnect coils in a series configuration or isolate groups of coils to result in parallel configurations. ITs cannot switch currents off. Switching is done by the IGBTs, MCTs or rectifier diodes only. ITs turn off after the switches 18 have turned coil currents off, depending on the control condition. The switches 18 in the same leg of the H bridge 24 are "bootstrapped" at the control module so that only one switch 18 can be ON at a time to prevent short circuiting the supply bus. Note that the extreme left and extreme right switches 18 are in single winding slot path arrangements without isolation triacs 19. Thus, the winding arrangements are open-ended to block any possible circulating current flows. Examples of basic control circuit functions are illustrated in FIGS. 3A and 3B. The control system effectively manages torque and current by two means: by the number of parallel winding slot paths energized and by management of back-emf.

FIG. 3A shows the circuit used during motor startup and low speed operation or a generator operating at full output voltage. I call this Control Mode 1. In this mode all coils in each slot path are in series with the solid-state switches 18. For any given slot path, any pair of complementary coils such as C11 and C12 for example, are either wound in opposite directions or are reverse connected, so the torques that they produce are in the same angular direction. For example, in FIG. 5, coils 21A and 21B correspond to coil C11 and C12 in FIG. 3A and are wound in opposite directions or reverse connected. As shown in FIGS. 1A, 2, 3A and 3B, isolation triacs (IT) 19 interconnect the switches 18 in the power control modules between winding coils in each slot path. When the motor speed increases the various winding coils of FIG. 3A are automatically reconnected to form the circuit of FIG. 3B, as will be explained later in more detail. Similarly, the winding coils of a generator can be reconnected to form the circuit of FIG. 3B to generate half the output voltage produced with the circuit of FIG. 3A.

The first means by which the control system manages torque capacity is by the number of slot paths energized in parallel through switches 18. At any speed, minimum torque condition exists if only one path is energized and maximum torque exists if all paths are energized, intermediate torque conditions achievable by energizing fewer paths. The second means is by reconfiguring the winding arrangement in each path in series and parallel combinations to compensate for reduction in winding currents caused by increasing back-emf as motor speed increases. The coils traversing the six poles of each slot path in the machine used as example can be configured in (1) Control Mode 1, one series group as in FIG. 3A, (2) Control Mode 2, two series groups of three coils as in FIG. 3B, the two groups connected in parallel, (3) Control Mode 3, three series groups of two coils each, the three groups connected in parallel and (4) Control Mode 4, six coils connected in parallel. This results in four reconfiguration modes, each with a speed range dependent on back-emf. See FIG. 4. By reconfiguring the windings as described, my motor concept is capable of maintaining torque capacity with increasing speed while under constant or nonchanging input voltage. In contrast, prior art would require increasing voltage with speed to maintain torque capacity.

The following describes the circuit configurations for the first two control modes in detail. The third and fourth modes follow the same control logic. The functional features of all slot paths are identical, so the following descriptions using FIG. 2 are applicable to all slot paths. In FIG. 2, all of the switches 50, 51, 52, etc. are the same as switches 18 of FIG. 1A and isolation triacs (IT) 45, 46, 46, etc. are the same as IT 19 in FIG. 1A. The reason the same parts 18 and 19 have different reference numbers in FIG. 2 is that during explanations of the routing of the current from source 30 it is necessary to refer to different ones of switches 18 and ITs 19 by new reference numbers.

The slot path circuit is configured as follows for Control Mode 1 using FIG. 2, which shows all circuit components in a typical slot path, except for rectifier diodes 20. Starting at the positive terminal of the power source 30, to positive ring bus 31, to switch 50 (switch 51 "bootstrapped" OFF), to wire 33, to coil C11, to wire 34, to isolation triac (IT) 45 (switches 52, 53, 54, 55 OFF), to wire 35, to coil C12, to wire 36, to IT 46 (switches 56, 57, 58, 59 OFF), to wire 37, to coil C13, to wire 38, to IT 47 (switches 60, 61, 62, 63 OFF), to wire 39, to coil C14, to wire 40, to IT 48 (switches 64, 65, 66, 67 OFF), to wire 41, to coil C15, to wire 42, to IT 49 (switches 68, 69, 70, 71 OFF), to wire 43, to coil C16, to wire 44, to switch 73 (switch 72 "bootstrapped" OFF), to negative ring bus 32, to the negative terminal of the power source 30. Current flow is positive. When negative current flow is required, alternate polarity switches 50, 51 and 72, 73 change state. Therefore, Control Mode 1 conditions are summarized as follows. Slot path coils C11, C12, C13, C14, C15, and C16 in FIGS. 2 and 3A, across all six poles are in series. The extreme left switch 18 connected to the positive bus is ON (negative switch in same leg is bootstrapped OFF) all ITs 19 (or 45, 46, 47, 48, 49) are ON (permissive) to connect all coils in the slot path in series and the extreme right negative switch 18 is ON (positive switch in same leg is bootstrapped OFF). All switches 52 to 71 in intermediate H bridges are OFF, thus forcing current from positive to negative bus through all slot path coils connected in series through IT's 45, 46, 47, 48 and 49.

The slot path circuit is configured using FIG. 2 as follows for Control Mode 2, where three coils are connected in series, the coil set energized in parallel with the other three coils, also connected in series. Starting at the positive terminal of the power source 30, to positive ring bus 31, to switch 50 (switch 51 "bootstrapped" OFF), to wire 33, to coil C11, to wire 34, to isolation triac (IT) 45 (switches 52, 53, 54, 55 OFF), to wire 35, to coil C12, to wire 36, to IT 46 (switches 56, 57, 58, 59 OFF), to wire 37, to coil C13, to wire 38, to switch 61 (IT 47 OFF and switch 60 "bootstrapped" OFF), to negative ring bus 32, to the negative terminal of the power source 30. This completes the first series connected coil set. Also starting at the positive terminal of the power source 30, to positive ring bus 31, to switch 62 (switch 63 "bootstrapped" OFF), to wire 39, to coil C14, to wire 40, to IT 48 (switches 64, 65, 66, 67 OFF), to wire 41, to coil C15, to wire 42, to IT 49 (switches 68, 69, 70, 71 OFF), to wire 43, to coil C16, to wire 44, to switch 73 (switch 72 "bootstrapped" OFF), to negative ring bus 32, to the negative terminal of the power source 30. Current flow is positive through both paralleled coil sets. When negative current flow is required, alternate polarity switches 50, 51, 60, 61 and 62, 63, 72, 73 change state. Therefore, Control Mode 2 conditions are summarized as follows. Half of same slot path coils to be connected in series, one coil group in parallel with the other half in the same slot path as shown in FIG. 3B, the IT 47 in the middle H bridge is OFF (isolating), the left negative switch 60 in the H bridge is ON and the right positive switch 63 on the same bridge is ON. This results in three series connected coils, C11, C12 and C13 energized in parallel with the next three series connected coils, C14, C15 and C16, in the same slot path.

Figure 4:
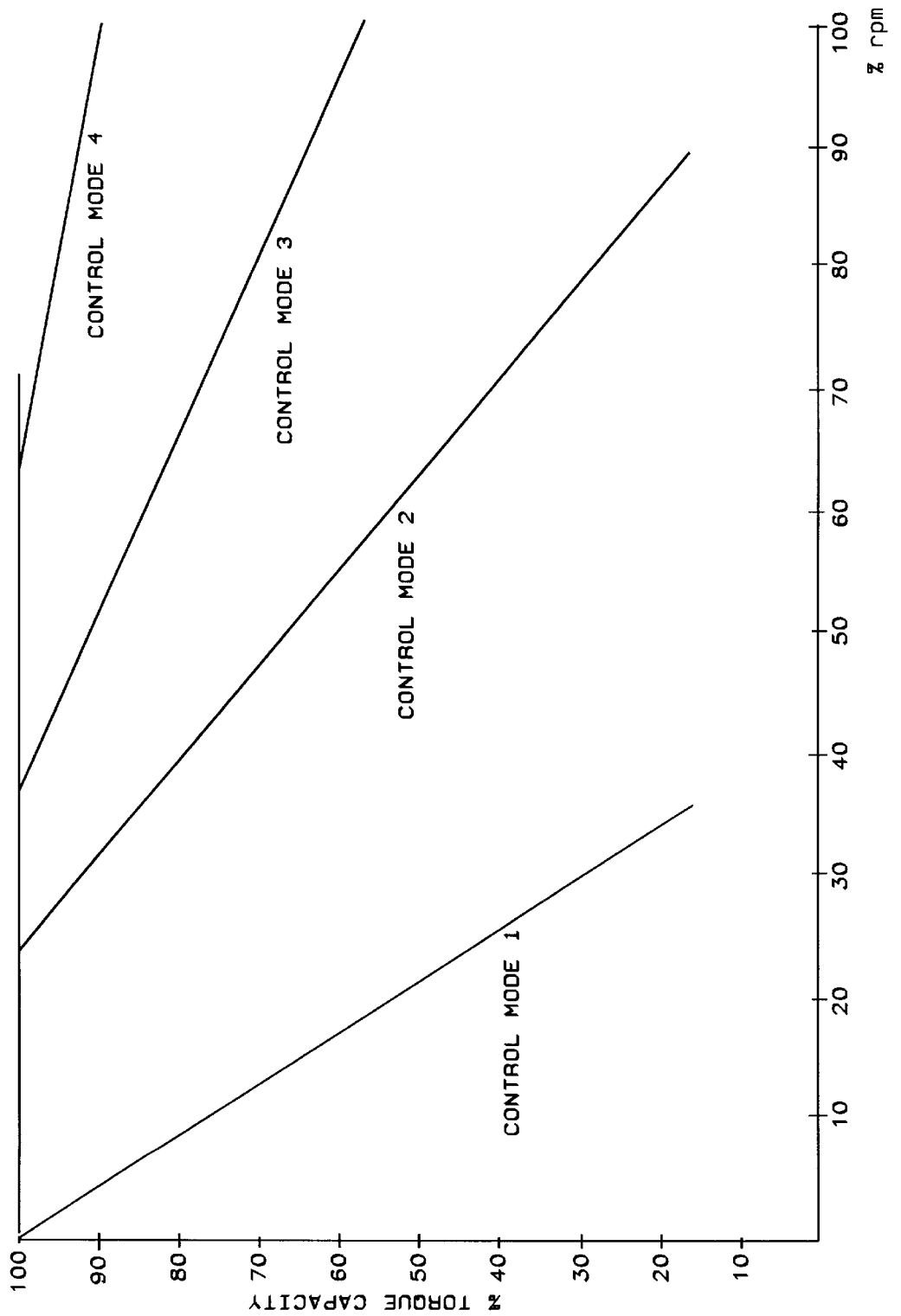
FIG. 4 is a typical torque-speed performance characteristic.

The logic for this arrangement and control scheme follows. For motor startup, coil current is only limited by the resistance of the windings and by the supply circuit transfer impedance. To limit the starting current and its duration, all winding slot paths are energized in Control Mode 1 where all slot path coils are in series for maximum starting torque, but with maximum series resistance. This limits starting or "locked rotor" current to within the capacities of switches and windings and is depicted in FIG. 3A. This also results in high rotor acceleration with quick buildup of back-emf and attendant reduction in coil current. As the speed increases while the motor is still in Control Mode 1, back-emf causes a reduction in torque capacity as described above and shown in FIG. 4. If the torque needs to be held at a high value, the control system automatically shifts some or all of the coil groups to Control Mode 2, thus reducing back-emf per series group by one half and allowing the coil current to increase toward the initial level. If the torque still needs to be held at a high value, the third and fourth control modes automatically come into effect, further reducing back-emf to one third and to one sixth (the back-emf of a single coil), again allowing the coil current to increase toward the initial level. In the fourth or, generally, the last control mode all isolation triacs, IT 45, 46, 47, 48, 49 in FIG. 2 are OFF, whereby the switches in the associated modules 24 connect all slot path coils in parallel. This extends the maximum torque capacity of the motor to the upper speed range while operating with constant driving voltage. This control scheme results in a torque/speed performance profile that can be tailored to the specific motor application without restriction, as illustrated in FIG. 4.

Finer resolution of the torque/speed characteristic profile is made possible by the number of energized winding slot paths and series/parallel combinations capable of spanning between the maximum torque capacities of the control modes. In the motor depicted in FIG. 1 as an example, torque/speed resolution can be as fine as 2% around an 80% total load level if the windings in each of three slot paths are energized in the first, second or third control mode while all other slot paths are energized at the fourth mode. At very low speed with all windings operating in the first control mode, the best resolution for this example would be 12.5%. Finer resolution at low speed may be achieved by lowering the supply voltage level or by proportioning the number of turns of the windings in one or more slot paths. That is, the windings can be proportioned to result in higher back-emfs and/or lower ampere-turns for smaller torque increments. The upper range of torque/speed performance is only limited by thermal considerations and the structural integrity of the rotor. Most of the internal losses of the machine are stator core losses that increase with speed.

Dynamic or regenerative braking or continuous generator action are effected by reversing the described control process by downshifting control modes. That is, if at a given speed more coils are switched in series, their combined back-emfs exceed the supply voltage resulting in reverse power flow into the source. If insulated gate bipolar transistors (IGBTs) are used, all IGBTs in the control modules of each slot path are reverse biased, thus turning the H bridges into rectifiers oriented to allow reverse current flow into the power source without exceeding the continuous current capacity of existing free-wheeling diodes 20. If MOS controlled thyristors (MCTs) are used, full capacity rectifier diodes take the place of free-wheeling diodes 20, reverse connected in parallel with the MCTs to allow reverse current flow into the power source. This feature enables my machine concept to change from motoring to power generation practically instantaneously, which would be useful for an energy storage (flywheel) system and traction or propulsion drive systems.

Commutation of the switches 18 takes place as the coil coupling the air gap fields of the moving poles enter transitional zones between polarities. Several options are available to accomplish this, whether it is a position sensing system, Hall generator based magnetic sensors or by using the coils as coupling detectors. See FIG. 6. The collapsing field flux linkage with a coil at the point of transition between magnet poles induces a current in opposition of the winding's load current with a canceling effect. This can be detected by a current monitoring circuit. When the net coil current approaches a zero level resulting from this canceling effect, the same circuit can generate a null signal to trigger commutation of the switches 18 in the control module 24. For motor startup a position sensing system or magnetic sensors must be used. I prefer to use a special Hall based magnetic sensor of my development. This sensor, when installed coincident with the angular position of a coil, can detect the polarity of the magnet engaging the coil to control the initial direction of current flow at startup, resulting in forward or reverse rotation; and the exact transitional point of reversal of polarity under dynamic conditions to control commutation. The number of magnetic sensors used must be equal to the number of slot paths (eight for the example in FIG. 1). A redundant pair of sensing systems of different characteristics should be used to ensure against common mode failures for acceptable reliability. The above magnetic sensors and coil null current detectors are examples of redundant sensing systems that can be used for this purpose.

The control logic in controller 82 of FIG. 6 can incorporate automatic, supervisory protective features as explained above. An automatic current limiting control feature may be provided to protect the motor windings and control modules. That is, if the coil current slew rate exceeds a preset level or the speed goes below a preset level for each control stage beyond first, the control automatically downshifts to a lower control mode to reduce coil current to within rated capacity. If the current slew rate continues to exceed the above preset level after downshifting, all of the control module switches in the affected slot path remain off in a lockout condition. That is, all coils in the affected slot path are deactivated as an integrated protective function. The above protection and control features can make use of commercially available integrated circuits and components such as MCTs by Harris Semiconductor and IGBTs by Powerex and Hitachi.

Control systems for controlling all aspects of the operation of electric motors and generators are old and well known. A control system to control almost all aspects and functions of any given new or old type of motor is well within the skill of the art. Therefore, a control system can be provided to control the various switches of my invention. To apply such a control system to the present invention, it is simply necessary to control the various switches such as 18, 50, 56, 61, 69, 73 in a way as to control the motor in any given way. Such a control system may sense the speed of the shaft 13 and use that speed as part of its control function. Thus, the motor can be controlled to shift in sequence from Control Mode 1 to Control Mode 4, or to provide a constant speed, or to provide a constant torque, etc.

Figure 9:
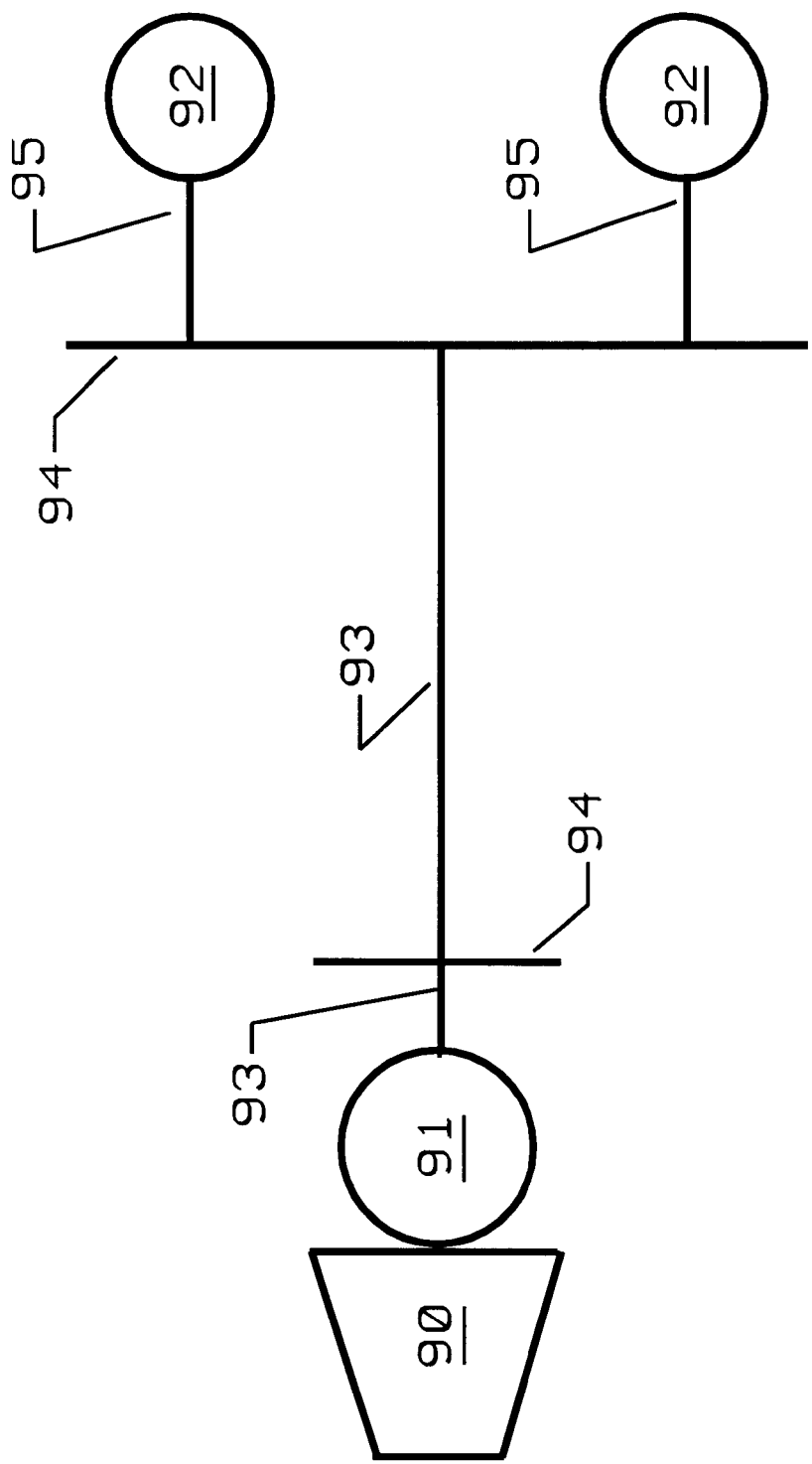
FIG. 9 is a one-line diagram of a system using generator and motor versions of machines based on the technology of this invention.
Figure 10:
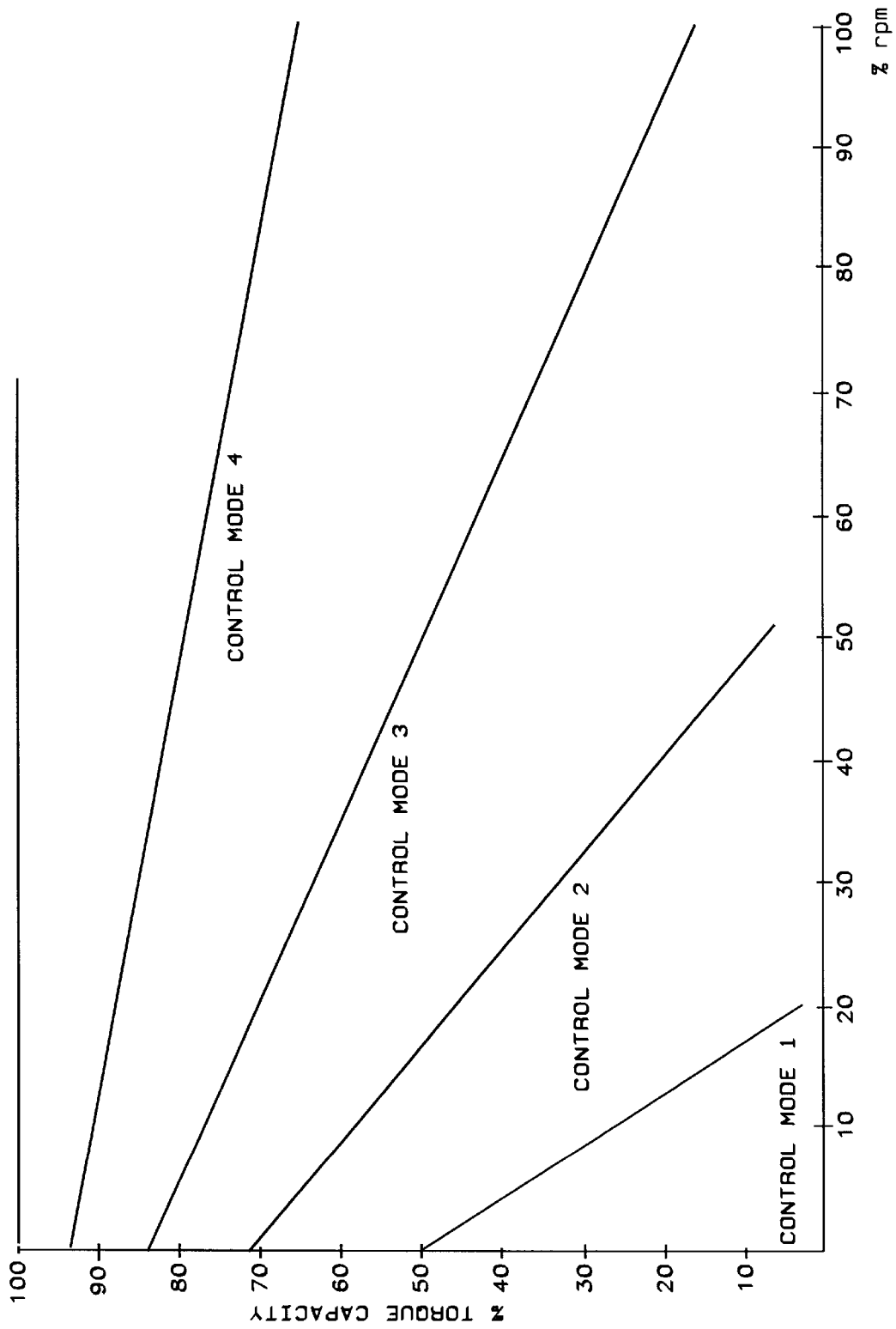
FIG. 10 is the torque-speed performance characteristic of a motor with reduced supply voltage.

The machine concept of this invention can be integrated in power systems with significant advantages over systems based on prior art permanent magnet machines. A typical system is shown in FIG. 9 and consists of a generator 91 driven by a prime mover 90, and motors 92 interconnected by direct current transmission lines 93, busses 94 and motor feeders 95. The generator prime mover may be a steam or gas turbine or internal combustion engine. The generator most desirably operates at a constant rotational speed coincident with the speed of maximum efficiency of the prime mover. This is not achievable with a prior art generator driven directly (without reduction gears) by a gas or steam turbine as prime mover. The maximum efficiency of a gas or steam turbine is at a very high rotational speed which a prior art generator cannot effectively use. Also, a prior art permanent magnet generator cannot change the air gap field or reconfigure windings, therefore the only means of changing the output voltage is by changing its rotational speed. In contrast, the machine concept of this invention working as a generator can change its output voltage by using different control modes of reconfigurable windings as shown in FIGS. 3A and 3B while driven at constant rotational speed. In the system described above the speed and torque control resolutions of motors are enhanced by multiple generator control modes. Such a system may be ideal for use in applications that require motors to operate at widely variable speeds with fine speed control resolution, especially at low speed. This is illustrated in FIG. 10, which shows the torque-speed performance characteristic of a motor under a supply voltage reduced to 50%, which corresponds to the generator operating in Control Mode 2. This characteristic shows that at 50% voltage the motor depicted in FIG. 1 operates in Control Modes 2 and 3 instead of Control Mode 1 in the low speed range of FIG. 4. This improves the resolution from 12.5% to about 2% as discussed in the detailed functional description above. Voltage control of the generator and speed or torque control of the motor(s) can be integrated in an external automatic process control system or manually at a manned control station.

I claim to have invented:

1. A permanent magnet direct current machine comprising:

said machine having a stator element, said machine having a rotor element, said elements defining an air gap between them, and poles, on said rotor, said poles comprising permanent magnets for providing magnetic flux across said air gap, said stator element having more slot paths, than there are poles in the rotor, each slot path having coils, said rotor element being rotatable about an axis, the gross angular width of each slot of each slot path, as measured in a plane perpendicular to said axis, being small as compared to the gross angular width of one of said poles as measured in said plane, each said pole, at any instant in time, facing a group of said coils, the group of coils which at any instant in time, faces a magnet pole, producing a flux which passes around such group and passes through the space between said group and the magnet pole that faces the group.

2. A machine as defined in claim 1, having:

switching means for providing a plurality of modes of operation of the machine, said switching means comprising switches for reconfiguring at least some of the coils in at least one slot path to provide different modes of operation of the machine.

3. A machine as defined in claim 1 comprising:

each pole providing flux to the coils of each slot path during each rotation of said rotor with a reversal of the flux through each coil whenever such coil receives its flux from a different one of said poles, and switches for reversing the direction of current flow through each coil at substantially the same time that the flux through such coil is reversed.

4. A machine as defined in claim 3 in which said switches reverse the direction through the coils of only one slot path at a time.

5. A machine as defined in claim 3 in which there are an even number of coils in a slot path, said switches connecting all of the coils of a given slot path in series with each other and the entire group of such coils of that slot path across said power line in one mode and a hybrid series/parallel coil arrangement across said power line in another mode.

6. A machine as defined in claim 3 in which there are an even number of coils in each slot path, said switches in one mode connecting all of the coils of one slot path in series with each other and in another mode connecting only half of the coils of said one slot path in series with each other.

7. A machine as defined in claim 3 in which structural vibrations are minimized by maintaining a highly uniform air gap flux distribution while in the influence of demagnetizing fluxes induced by load currents in the slot path coils.

8. A machine as defined in claim 1 in which said slot paths comprise means for minimizing pulsating torques of the machine.

9. A machine as defined in claim 1, having magnetic material in the space between said poles and said slot paths to form a low reluctance path for said flux.

10. A direct current machine, comprising:

a stator, a rotor having a plurality of poles each of which produces a magnetic field that passes in the opposite direction, relative to the pole, as its neighboring poles, said rotor and said stator having an air gap between them, a plurality of slot paths in said stator, each said slot path having as many slots as there are poles on said rotor, said slots extending radially outward from said air gap and into said stator, and a layer of magnetic material contiguous with said air gap and extending over a limited area of said rotor or said stator.

11. A direct current machine as defined in claim 10, in which:

said rotor having at least one permanent magnet on said rotor for producing said magnetic field, said layer comprising means for diverting at least a portion of the flux, produced by the passage of current through a coil of a slot path, away from said one permanent magnet.

12. A direct current machine as defined in claim 10, in which said layer extends over at least part of the surface of at least one of said poles.

13. A direct current machine as defined in claim 10, in which said layer extends over the entire face of each pole.

14. A direct current machine as defined in claim 10, in which said layer extends over at least a portion of said stator.

15. A direct current generator, comprising:

said generator having a stator, said generator also having a rotor with a plurality of poles each of which produces a magnetic field that passes in the opposite direction, relative to the pole, from the direction of the field produced by its neighboring poles, said rotor having an axis, an output having at least two conductors, said rotor and stator having an air gap between them, a plurality of slot paths in said stator for generating a potential difference across said conductors, each said slot path having as many coils as there are poles on said rotor, and a control device that reconfigures the interconnections of said coils and changes the potential difference between said output conductors.

16. A direct current machine, comprising:

a stator, a rotor having poles and rotating about an axis, said rotor and stator defining an air gap between them, said poles feeding a magnetic field across said air gap, said stator having slot paths, each of which slot paths has coils, the coils of each slot path being equal in number to the number of poles on said rotor and equally angularly spaced around said axis.

17. A direct current machine as defined in claim 16 in which said stator has slots that have said coils passing through them, each slot path having as many slots in said stator as there are poles on said rotor, each coil extending through two slots that are angularly spaced apart around said axis by an angle equal to 360 degrees divided by the number of poles.

18. A machine as defined by claim 17 in which said rotor has at least one permanent magnet for producing said magnetic fields.

19. A direct current machine as defined in claim 16 in which said machine is a generator, said rotor passing flux through each slot path which reverses direction each time a pole passes the slot path, and apparatus associated with each slot path for reversing the direction of current flow through the slot path each time the flux through the slot path reverses its direction, said apparatus including an H-bridge having four diodes for effecting said reversal of the direction of the current flow.

20. A machine as defined in claim 19, in which the H-shaped bridge consists of:

two pairs of diodes, with the diodes of each pair having a connection for connecting the diodes of such pair in series with each other, the H-shaped bridge also having an isolation triac connected between said connections.

21. A direct current machine as defined in claim 16 in which said machine is a generator which enables its output voltage to be varied without changing the speed at which the generator operates, comprising:

switches for reconfiguring the coils of each said slot path to change said output voltage without changing the speed at which said rotor rotates.

22. A machine as defined in claim 21, in which said switches include means for reconfiguring each slot path in substantially the same way to obtain said variation in said output voltage without changing the speed at which the generator operates.

23. A machine as defined in claim 22 and a motor driven by said output voltage, said motor having a rotor with poles, said motor having a stator with slot paths thereon, and means for reconfiguring a slot path on at least one of said motor and said generator to provide said motor with a desired operating condition.

24. The method of providing a direct current generator which enables its output voltage to be varied without changing the speed at which the generator operates, comprising:

providing a rotor that has poles, providing a stator having a plurality of slot paths on the stator, providing each slot path with as many coils thereon as there are poles on said rotor, and reconfiguring the coils of each slot path to change the output voltage without substantially changing the speed at which the rotor rotates.

25. The method of claim 24 in which each slot path is reconfigured in substantially the same way to obtain said output voltage.

26. The method of claim 25 comprising:

providing a motor having a rotor that has poles, providing said motor with a stator, providing said stator with slot paths with each of said slot paths having as many coils on said stator as the rotor has poles, and reconfiguring a slot path of at least one of said generator and said motor to control the motor.

* * * * *